UNITED STATES PATENT OFFICE.

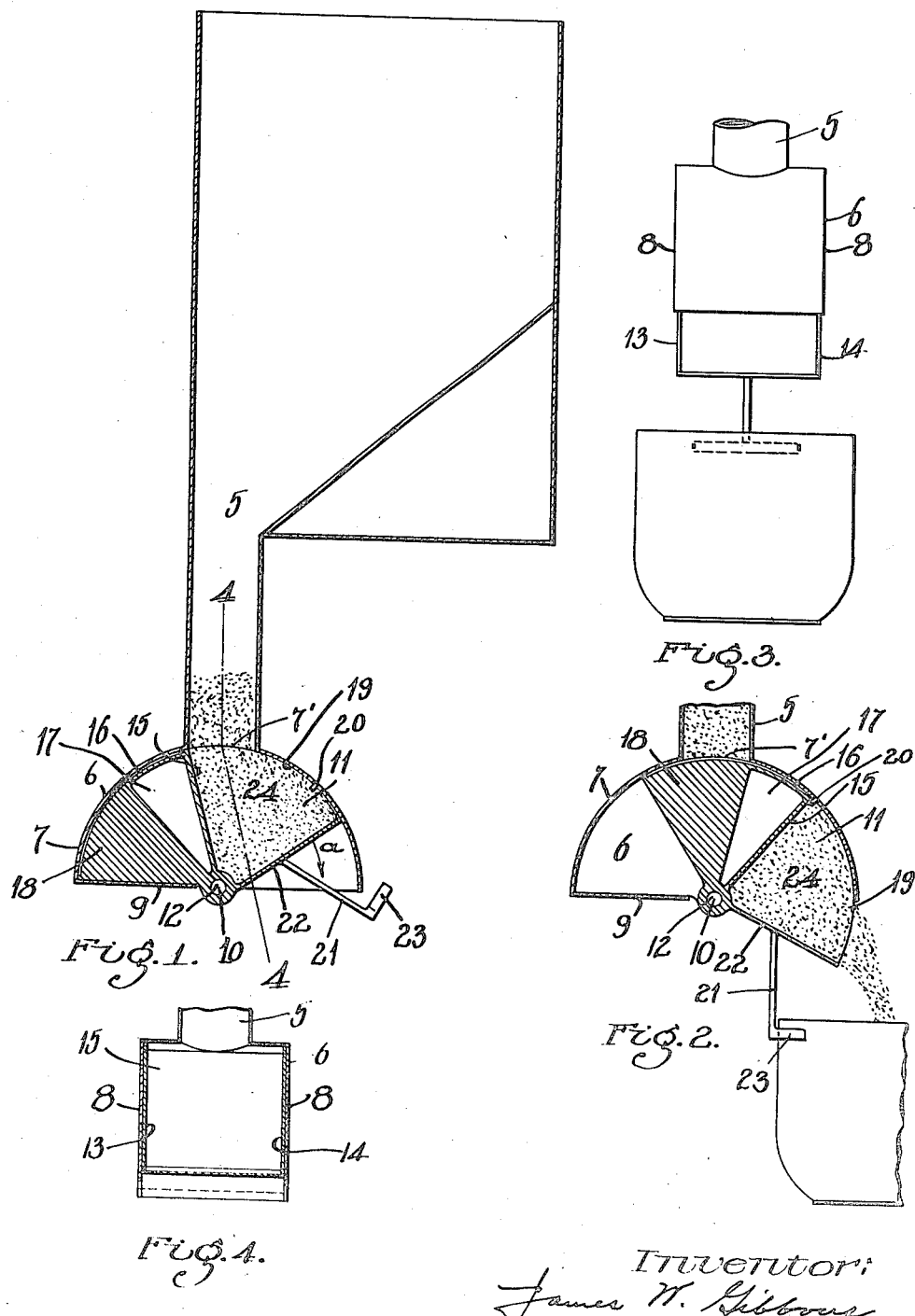

JAMES W. GIBBONS, OF BOSTON, MASSACHUSETTS.

ROTARY MEASURING DEVICE.

1,277,406.  Specification of Letters Patent.  Patented Sept. 3, 1918.

Application filed January 25, 1917. Serial No. 144,532.

*To all whom it may concern:*

Be it known that I, JAMES W. GIBBONS, a citizen of the United States, residing at Boston, in the county of Suffolk and State of Massachusetts, have invented new and useful Improvements in Rotary Measuring Devices, (Case A,) of which the following is a specification.

This invention relates to an improved measuring device which is adapted to measure a certain amount of sugar or other material and is particularly adapted to be used in restaurants known as "cafeterias", where the patron receives different articles of food upon a tray and carrying said tray in one hand is given a cup of coffee or tea which he carries in the other hand. In order to help himself to sugar he is obliged to put the tray down to put the sugar into his coffee or tea.

The object of this invention is to enable him to get a sufficient portion of sugar without putting the tray down by simply pushing his cup of coffee or tea against a portion of the measuring device which then delivers into the cup the desired portion of sugar.

The invention consists in the combination and arrangement of parts set forth in the following specification and particularly pointed out in the claim thereof.

Referring to the drawings:

Figure 1 is a sectional elevation of my improved measuring device illustrating the measuring cup filled with sugar.

Fig. 2 is a sectional elevation similar to Fig. 1 illustrating the measuring cup moved to a position in which it is discharging sugar into the cup of coffee or tea.

Fig. 3 is a side elevation as viewed from the right of Fig. 2.

Fig. 4 is a sectional elevation taken on line 4—4 of Fig. 1.

Like numerals refer to like parts throughout the several views of the drawings.

In the drawings, 5 is a container, 6 is a hollow segmental casing having a semicircular periphery 7, two oppositely disposed sides 8 and a bottom 9 extending from the center 10 of said segmental casing to the periphery thereof on one side of said center. The periphery 7 of said casing has an orifice 7' therein opening into the lower end of the container 5.

A rotary cup 11 is pivoted at 12 to the center of the casing 6. Said cup has two sides 13 and 14 and a radial partition 15 extending from the pivot 12 to the periphery of said cup. A bottom plate 22 extends from the center of the cup to the periphery thereof at the lower edges of the sides 13 and 14 of said cup. Between the sides 13 and 14 and the radial partition 15 and the periphery 16 of said cup is inclosed a chamber 17 which contains a counterweight 18.

The periphery of the cup 11 is provided with an opening 19 which preferably extends from the partition 15 to the lower edge of the sides 13 and 14 and the periphery of said cup 11 is in close proximity to the inner surface of the periphery of the casing. It will thus be seen that the periphery 7 of the casing 6 forms a cover for the cup 11.

A stop pin 20 is fastened to the periphery 7 of the casing and projects into the cup 11 so that it will engage the partition 15 when the cup is in the position illustrated in Fig. 2, thus forming a stop to limit the distance to which the cup can be moved in the direction of the arrow $a$, while the bottom 9 forms a stop against which the counterweight 18 rests when the cup is in the position illustrated in Fig. 1. An arm 21 is fastened to the bottom plate 22 of the cup and has a curved plate 23 fastened thereto.

The general operation of the device hereinbefore specifically described is as follows: Assuming the parts to be in the relative positions illustrated in Fig. 1, with the counterweight 18 resting against the bottom 9 of the casing and with the opening 19 standing in alinement with the orifice 7' at the bottom of the container 5, the sugar 24 flows downwardly from the container 5 through the orifice 7' and into the measuring cup 11 filling that portion of the measuring cup between the sides 13 and 14 thereof and the partition 15 and bottom plate 22. The periphery 7 of the casing 6 prevents the sugar from passing out of the cup 11 when it is in this position. The user places the edge of his coffee or tea cup against the plate 23 and pushes against said plate, moving the cup 11 from the position illustrated in Fig. 1 to that illustrated in Fig. 2 until the partition 15 abuts against the stop pin 20.

During the first part of this movement of the cup 11 in the direction of the arrow $a$, the periphery of the cup outside the chamber 17 is moved across the orifice 7' and thus closes the lower end of the container 5. At this time the parts are so proportioned that the bottom plate 22 of the cup will be flush with the bottom edges of the sides 8 of the casing 6, so that no sugar can flow into the measuring cup or out of it when it is in this position. Upon a further movement, however, of the measuring cup the opening 19 in the periphery of the cup 11 passes beyond the circular periphery 7 of the casing 6 and the sugar then flows out of the measuring cup into the cup of coffee or tea held by the user against the plate 23. It will be noted that when in this position the two sides 13 and 14 of the cup 11 and the bottom plate 22 form a three sided chute which directs the sugar into the coffee cup without any danger of spilling the same.

As soon as the sugar is emptied from the measuring cup the user removes the coffee cup and the counterweight 18 immediately moves the measuring cup from the position illustrated in Fig. 2 to that illustrated in Fig. 1. In this movement of the measuring cup it will be seen that the bottom plate 22 of said measuring cup passes behind the circular periphery 16 of the casing 6 before the opening of the measuring cup comes into alinement with the orifice 7' so that no sugar can pass from the container 5 into the measuring cup until said measuring cup is in a position where none of said sugar can pass out of the same.

Having thus described my invention, what I claim and desire by Letters Patent to secure is:

A device for measuring material having, in combination, a container for said material having an outlet orifice in the bottom thereof, a hollow segmental casing attached to said container and having a semi-circular periphery, two oppositely disposed sides, and a bottom extending radially from the center of said segmental casing to the periphery thereof on one side only of said center and constituting a stop, the periphery of said casing having an orifice therein opening into the outlet orifice of said container, a rotary measuring cup consisting of a segment of a hollow disk having an opening in its periphery adapted to be moved into alinement with said outlet orifice, said rotary cup having two oppositely disposed sides and a radial portion dividing the interior thereof into two chambers, and a counterweight in one of said chambers, the periphery of said cup adjacent to the chamber containing said counterweight being adapted to close said outlet orifice when said cup is moved to carry the opening in the periphery thereof out of alinement with said orifice, said cup being movable to such a position that a portion of the opening in the periphery may pass beyond said casing to allow material to flow out of said cup.

In testimony whereof I have hereunto set my hand in presence of two subscribing witnesses.

JAMES W. GIBBONS.

Witnesses:
CHARLES S. GOODING,
SYDNEY E. TAFT.